Figure 5:
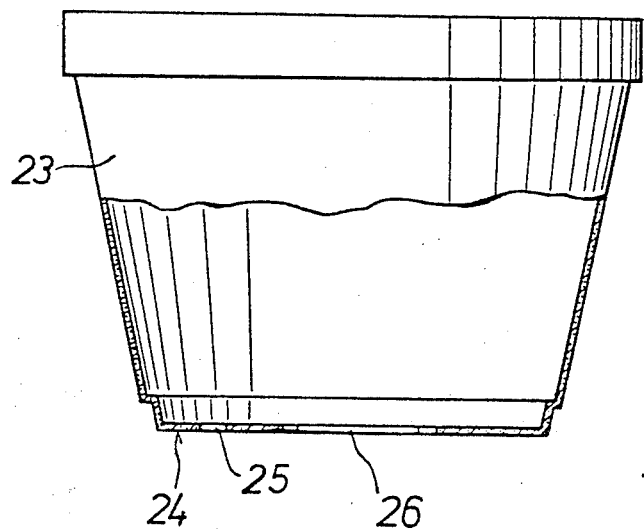

United States Patent [19]

Joswig et al.

[11] 4,420,904

[45] Dec. 20, 1983

[54] DEVICE FOR FEEDING POTTED PLANTS

[75] Inventors: Siegfried Joswig, Kausen/Betzdorf/Sieg; Johannes Liebscher, Nassau; Peter Keils, Obernhof; Peter Tiwi, Fachbach, all of Fed. Rep. of Germany

[73] Assignee: International Standard Electric Corporation, New York, N.Y.

[21] Appl. No.: 480,511

[22] Filed: Mar. 30, 1983

Related U.S. Application Data

[63] Continuation of Ser. No. 216,991, Nov. 10, 1980, abandoned.

[30] Foreign Application Priority Data

Mar. 15, 1979 [DE] Fed. Rep. of Germany ....... 2910217

[51] Int. Cl.$^3$ ............................................... A01G 9/02
[52] U.S. Cl. ..................................................... 47/81
[58] Field of Search ........................................ 47/79–81

[56] References Cited

U.S. PATENT DOCUMENTS 3,739,524 6/1973 Rose ........................................ 47/81

FOREIGN PATENT DOCUMENTS

| 289885 | 10/1965 | Australia ................................ 47/81 |
| 291269 | 10/1965 | Australia ................................ 47/81 |
| 934258 | 9/1955 | Fed. Rep. of Germany .......... 47/81 |
| 1030096 | 5/1958 | Fed. Rep. of Germany .......... 47/81 |
| 2419703 | 11/1975 | Fed. Rep. of Germany .......... 47/81 |
| 1395186 | 3/1965 | France ..................................... 47/81 |

*Primary Examiner*—Robert E. Bagwill
*Attorney, Agent, or Firm*—John T. O'Halloran; Mary C. Werner

[57] ABSTRACT

A device for feeding potted plants, consisting of a plant pot comprising a slot for the introduction of a wick, the said wick being attached to a tongue forming part of an adapter, a device for varying the level of the plant pot arrangement in a re-potting unit and a level indicator.

9 Claims, 21 Drawing Figures

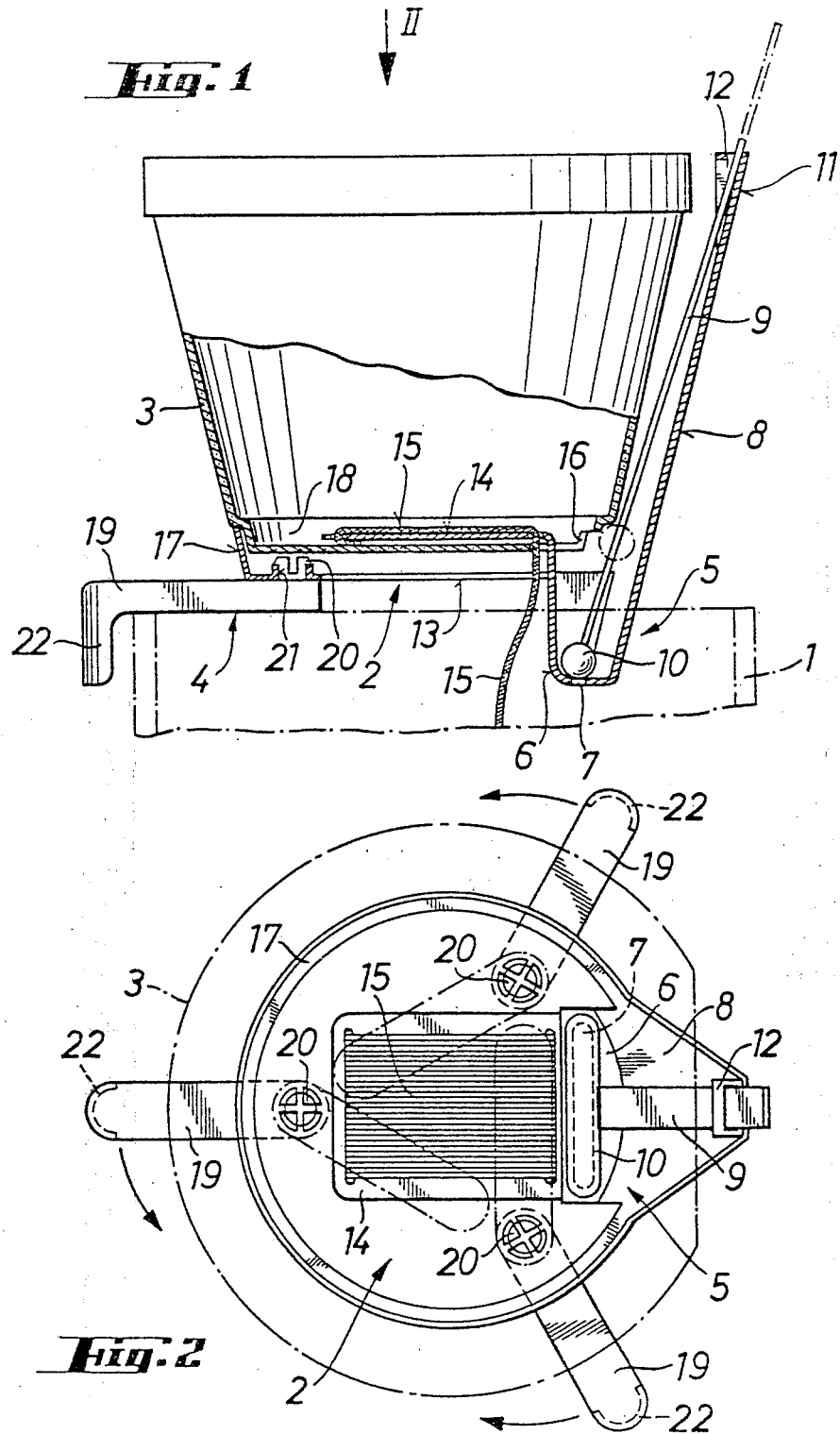

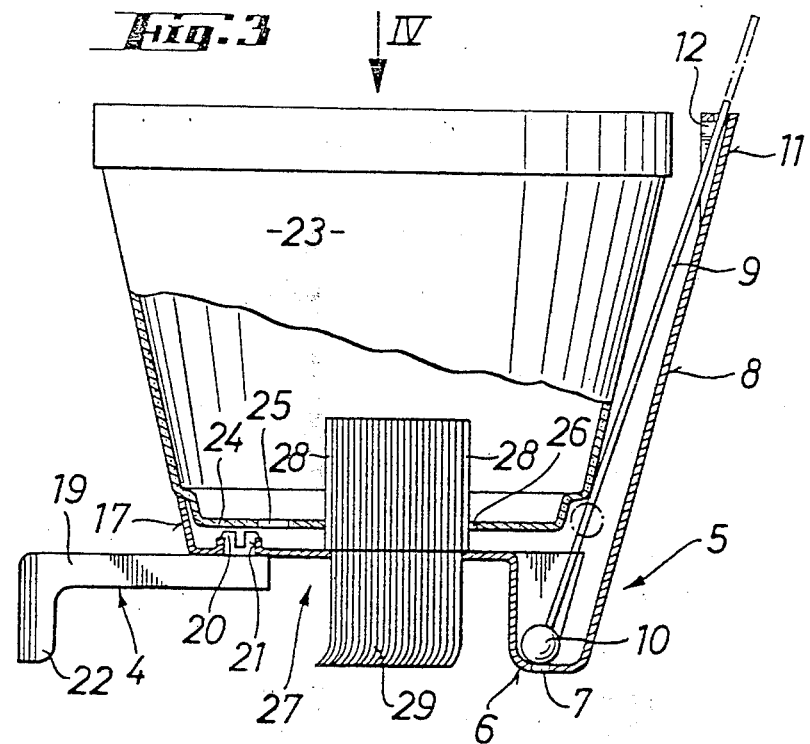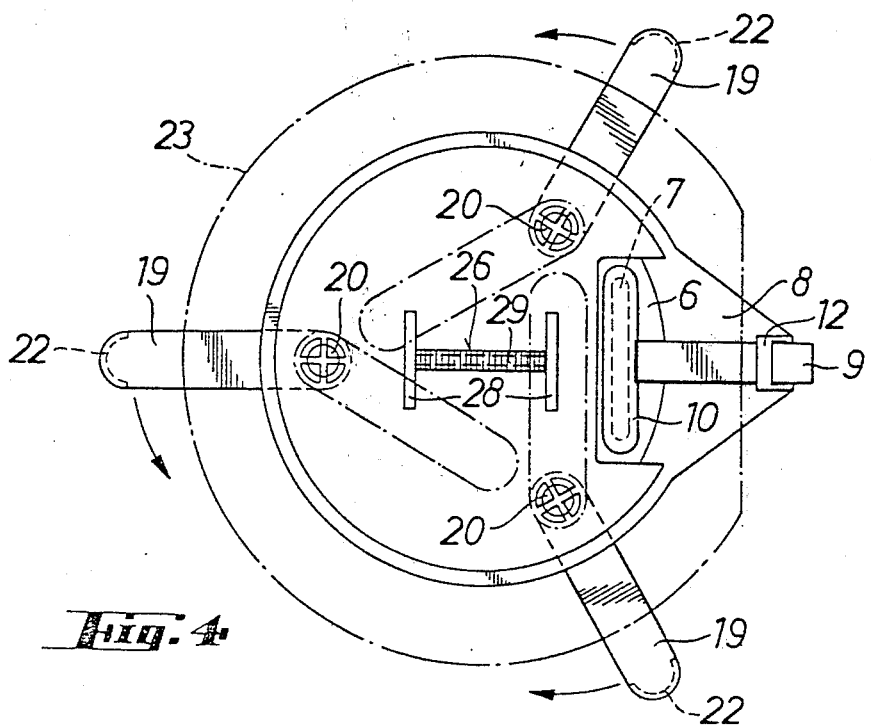

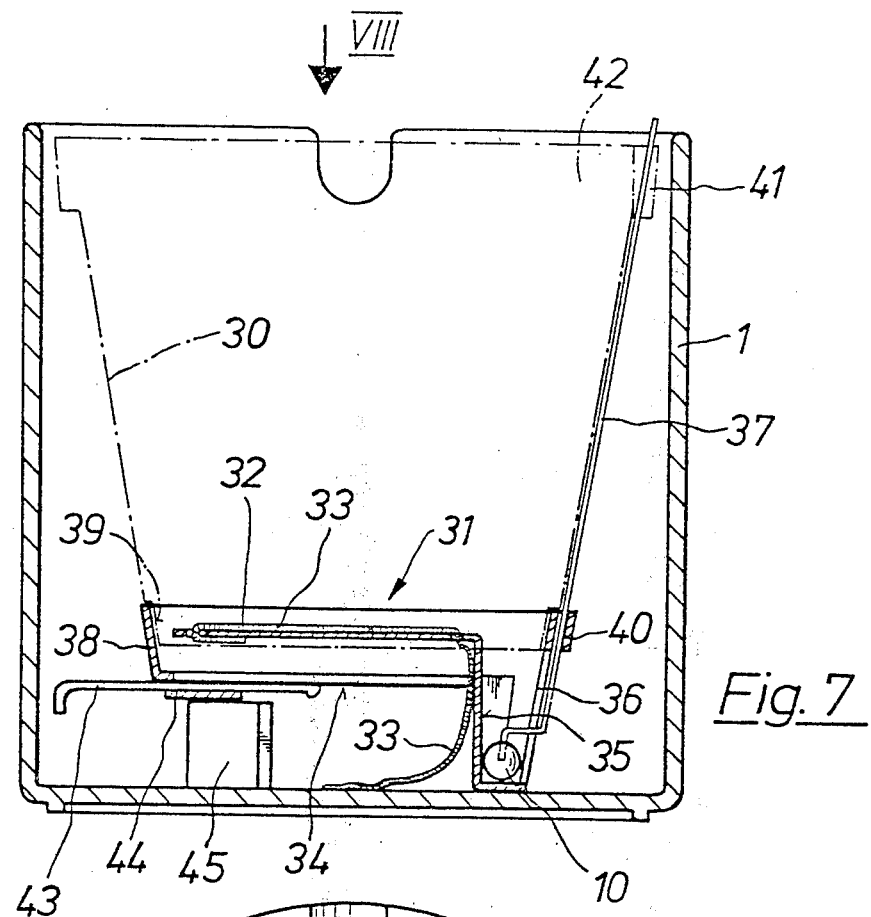
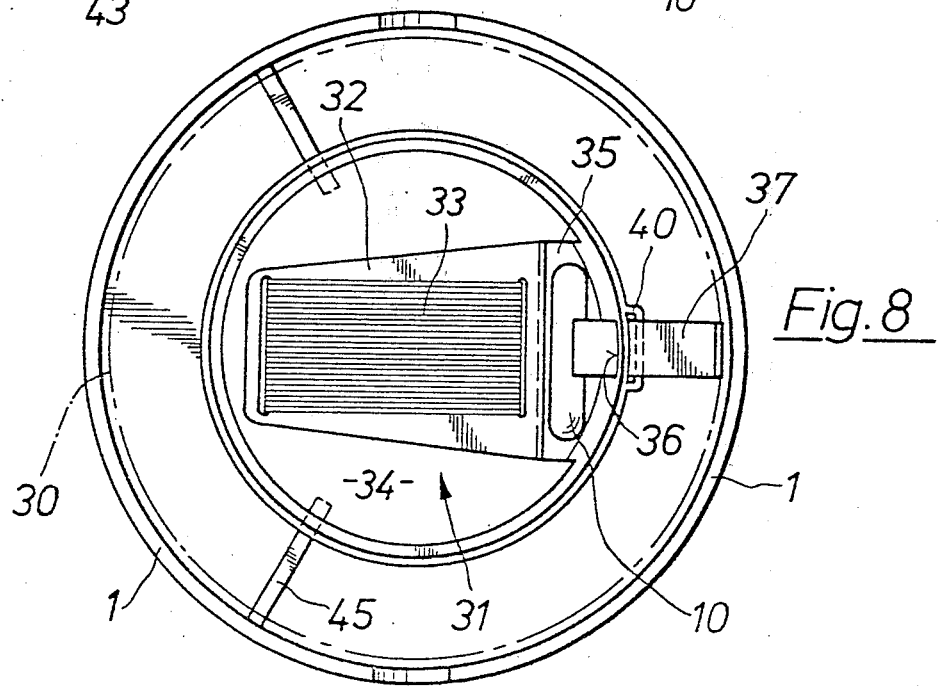

DEVICE FOR FEEDING POTTED PLANTS

This application is a continuation, of application Ser. No. 216,991, filed Nov. 10, 1980 (now abandoned).

The invention relates to a device for feeding potted plants, as defined in the preamble of claim 1.

These devices are used to feed the plants with at least water over a relatively long period of time without intermediate watering being required. In this connection a distinction is made nowadays between two principal methods. The first method is generally known by the name hydroponics. In this case the roots of the plant are fully immersed in water or a nutrient solution and held only by a granular, air-permeable substrate. The soil in this case is completely removed from the plant roots. The second principal method used is pure soil culture combined with so-called longterm watering. In this case the plant is simply cultivated in soil as in the customary manner. The plant receives water in this case from a reservoir through a wick arrangement. This type of watering device for potted plants was disclosed, for example, in German Offenlegungsschrift No. 2,610,613. In this specification the plant pot is mounted on a unit provided with an absorbent wick and arranged, together with the latter, in a re-potting unit serving as a water reservoir. The disadvantage with this arrangement is that the absorbent wick is in direct contact with the garden mold which absorbs the water until completely saturated so that the plant is overwatered. This, together with the soil, leads to signs of rotting of the root system. A further disadvantage is the absence of a level indicator. This means that firstly it cannot be reliably or conveniently observed when the water has been consumed and that secondly precise filling is a complicated operation.

A further drawback is that the water supply cannot be increased in the event of a relatively long absence, for example, during holiday time.

French Patent Specification No. 1,492,789, Patent of Addition No. 94.471, discloses a solution wherein a larger quantity of water can be supplied in the event of a relatively long absence without the plant as such being fully immersed in water. A ring, which is to be mounted on the re-potting unit and in turn presses onto the plant pot having a wick unit, is used for this purpose. As in the previous case, this solution does not provide a level indicator and the previously described problems arise. Overwatering of the plant is unavoidable also in this case. The ring for providing a solution to the so-called holiday problem can easily be lost.

Another device for watering potted plants is known from French Patent Specification No. 1,395,154. In addition to the described overwatering problems and the lack of a solution to the holiday problem, this device has the disadvantage that the water reservoir and absorbent wick unit are specially coordinated with one another. It is therefore impossible to incorporate the device in conventional re-potting or potting-on units. As a result the plant pot must be designed to be visually observable. In addition, a special and fairly expensive adapter must be provided, together with the absorbent wick unit. This makes the entire arrangement fairly costly so that it can only have a limited range of application.

It is the object of the invention to provide a device for feeding potted plants which makes it possible to supply different quantities of water by simple and easily handled means, which ensures the circulation of air through the root system and an adequate supply of water, and which gives a precise indication of the water level to facilitate refilling.

This object is achieved by the characterizing features of claim 1. Uniform watering over a wide area of the plant holder, together with excellent oxygen absorption, is achieved on account of the flat design of the absorbent wick. Over-zealous watering, which is detrimental to the root system and is unavoidable with cyclindrical wick systems, is completely eliminated. Owing to the simultaneously integrated level indicator, overfilling of the water reservoir is reliably prevented, ensuring that the root system of the plant is never fully immersed in water. Nevertheless, even greater quantities of water can be provided by the adapter, for example in the event of prolonged absence, without any disadvantage to the plant. A further advantage is that all the components are connected so as to ensure simple and trouble-free operation. Sources of trouble are largely eliminated, and complicated fitting operations are not required.

Other advantageous embodiments of the invention can be found in the sub-claims. Thus, the absorbent wick unit is connected to the plant pot by a tongue. The tongue, which is large in area, supports the absorbent wick and is introduced through slot-shaped openings in the plant pot. This has the advantage that only very small modifications need to be made to the actual plant pot, compared with the plant pots currently in general use. In the simplest example only one slot-shaped opening is required, and consequently the plant pot can be filled, as before, by automatic potting machines.

In order to achieve moistening over an even greater area of the plant holder, the tongue is connected to an absorbent mat in the bottom of the plant pot. This solution is proposed particularly when the plant holder consists of a core of soil directly enclosing at the least the root core and an air-permeable, capillary substrate surrounding the said soil core.

This arrangement makes simple use of the hydroponics method possible, without the hitherto generally known problems. With hydroponics, as currently practised, it is necessary to cultivate special plants. The soil must be completely cleaned off these plants or their roots before they are placed in the substrate, which is usually a light expanded clay aggregate. On the other hand, with the device according to the invention, it is not necessary for the soil to be cleaned off the plant roots. In this case the plants are placed in the plant pot with the so-called ball of roots and surrounded by an air-permeable capillary substrate. In this connection with quantity of soil still left on the root system of the plant is of no importance. After a certain time the plant roots will in any case penetrate the ball of soil and become anchored in the substrate. Water and, if necessary, nutrients are then fed through the substrate into the root core via the flat wick and, if necessary, the absorbent mat, although this is not absolutely essential.

The adapter of the plant pot in the re-potting unit, which can be designed in accordance with the invention by means of different constructional solutions, enables the quantity of water to be multiplied without the plant pot being placed in the water reservoir. Owing to the absorbent wick being large in area, reliable watering of the plant is achieved even when this aspiration level is relatively high. As the level indicator also moves due to the protective trough on the unit, it is fully capable of operation in the event of overfilling even when the plant pot is suspended in the long-term watering system (the holiday system).

It is obvious that any desired combination of solutions from the individual sub-claims is also possible.

Figure 6:
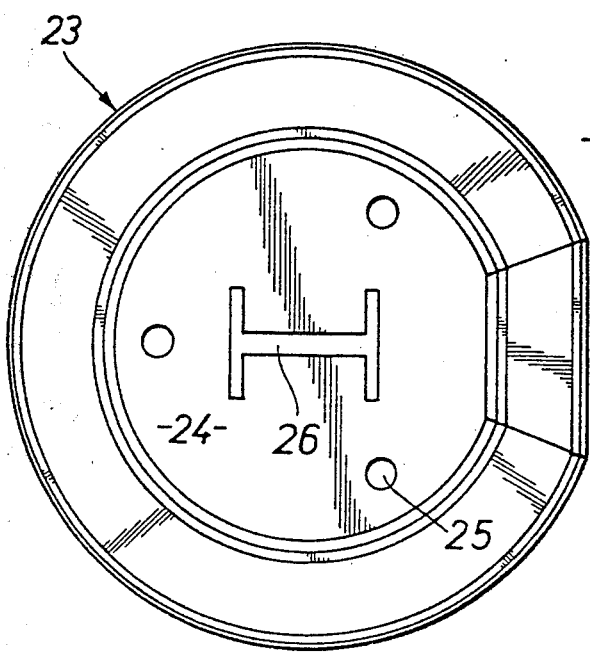
Figure 9:
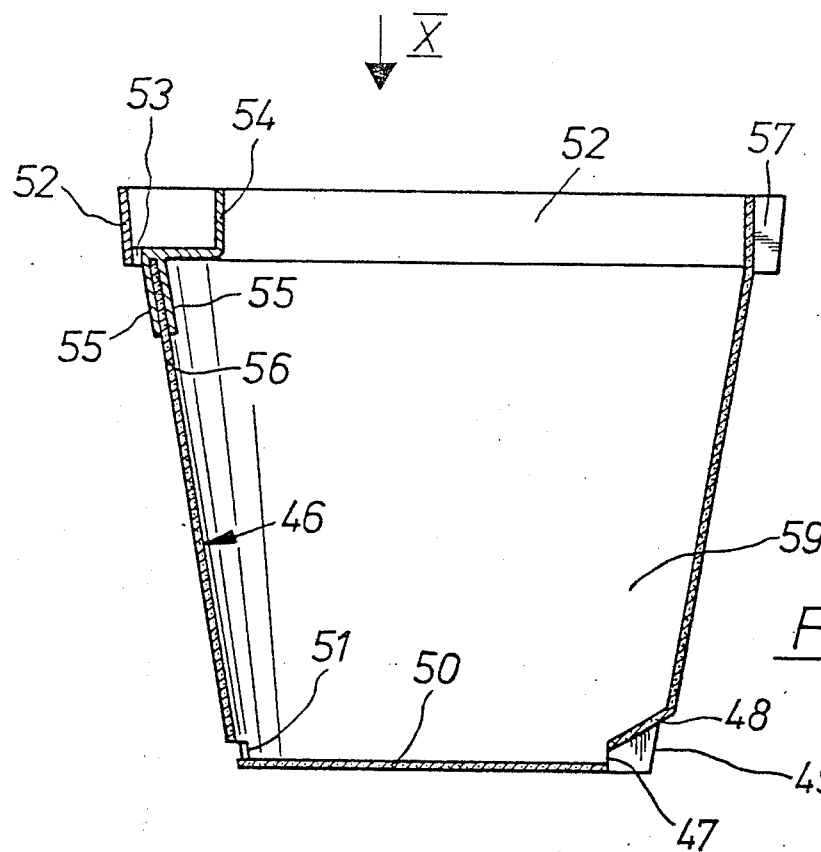
Figure 10:
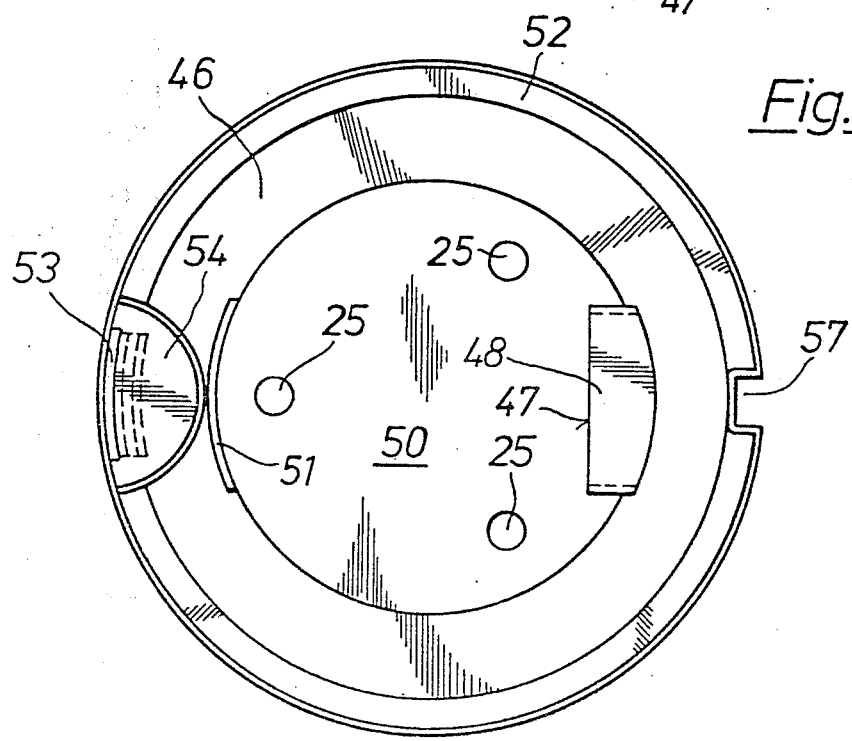
Figure 11:
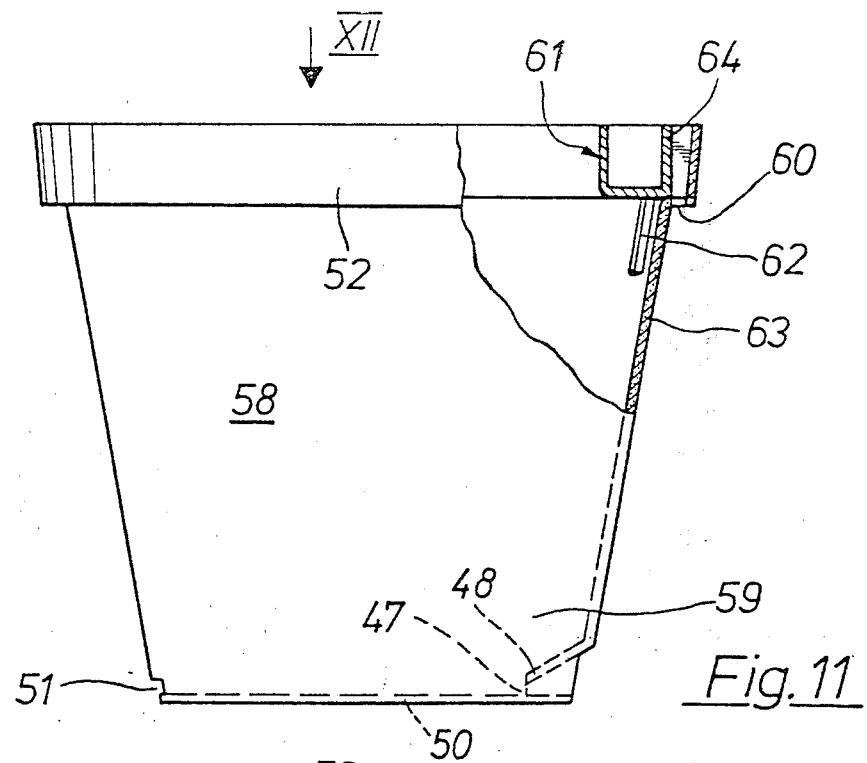
Figure 12:
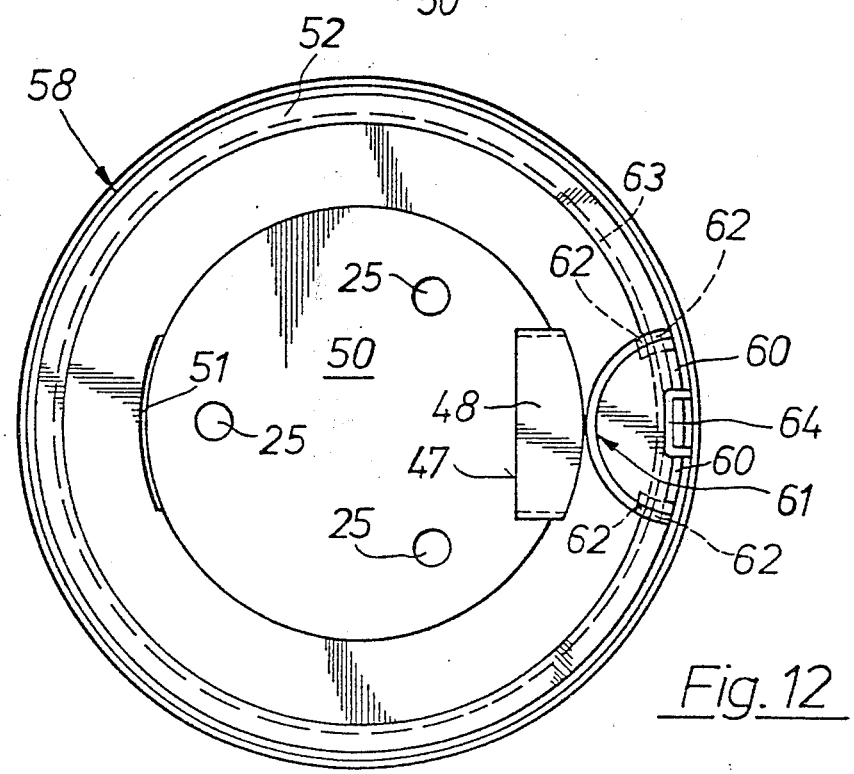
Figure 13:
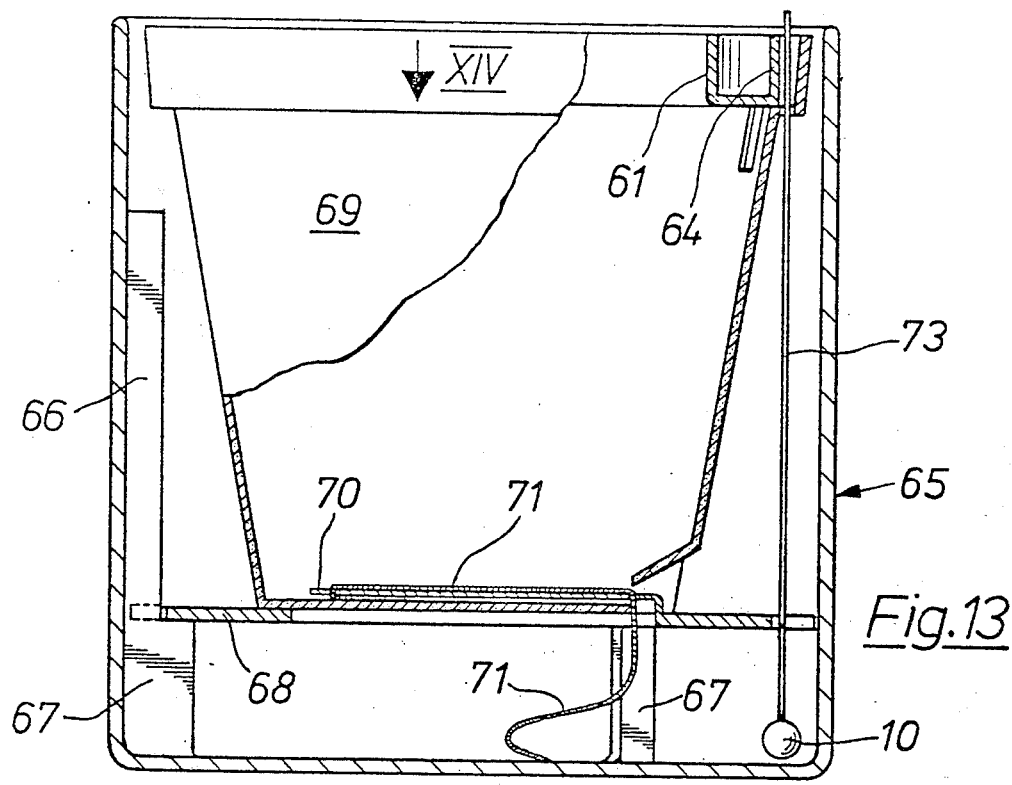
Figure 14:
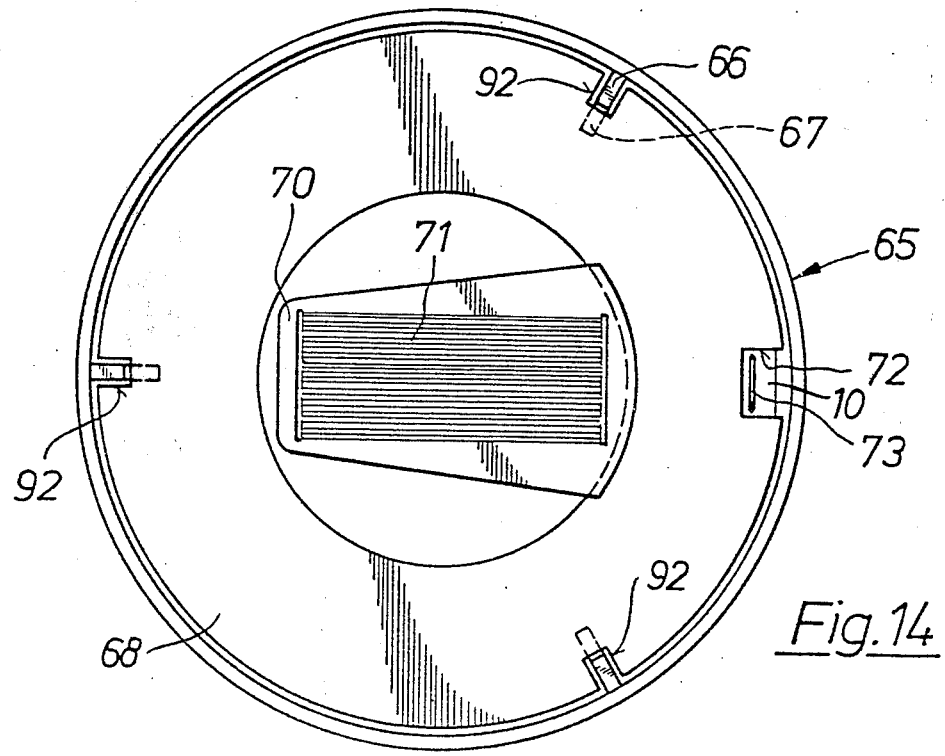
Figure 15:
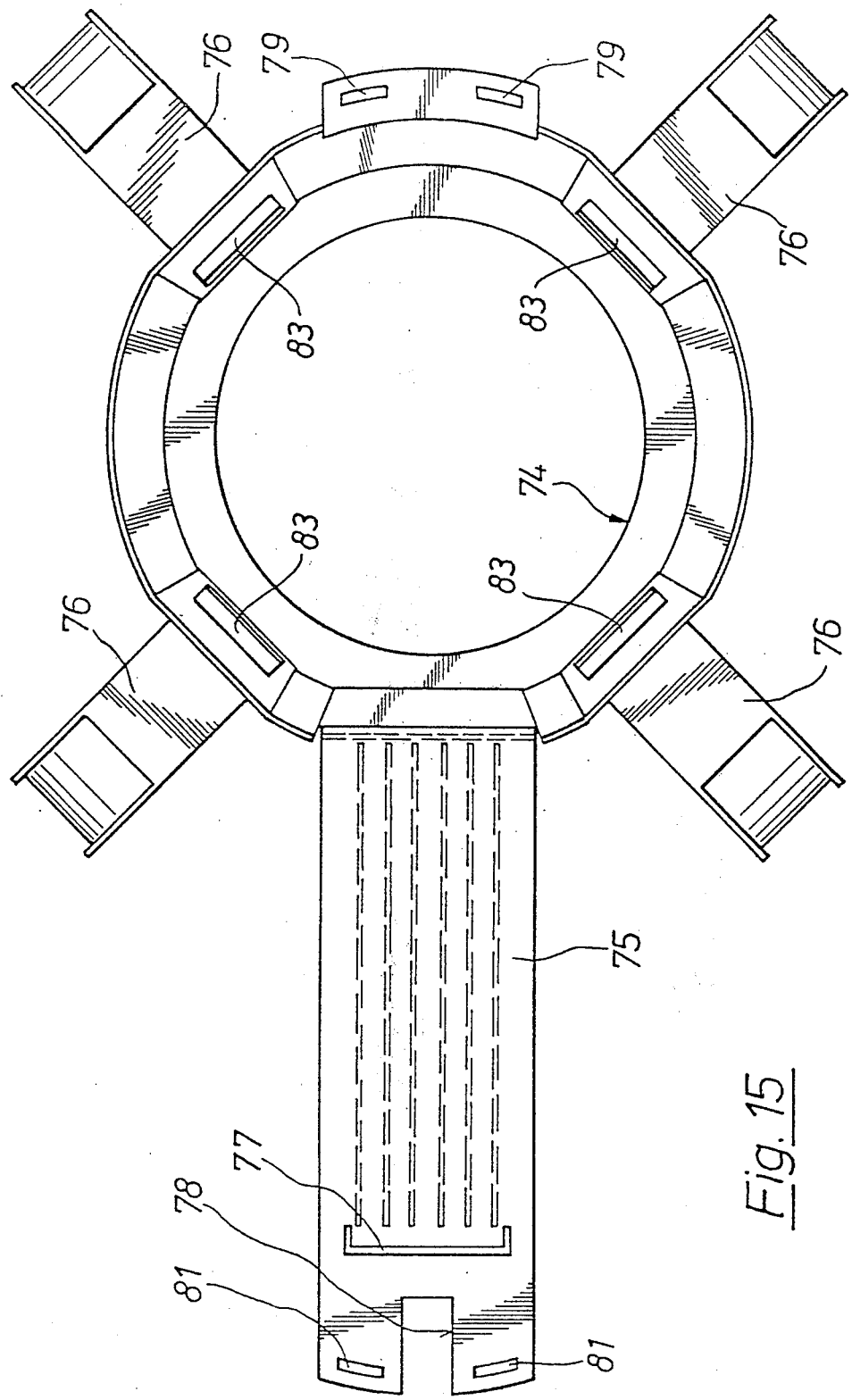
Figure 16:
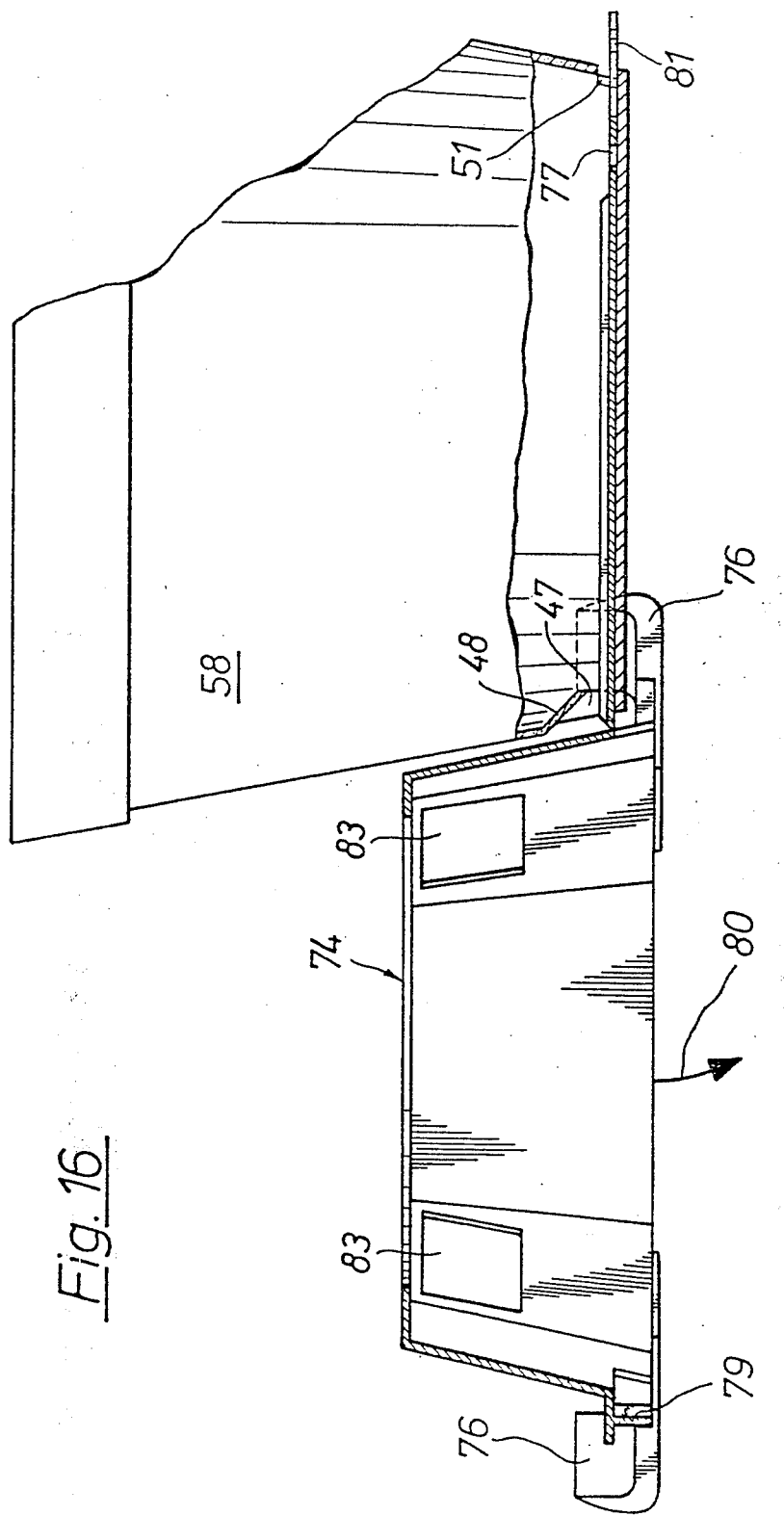
Figure 17:
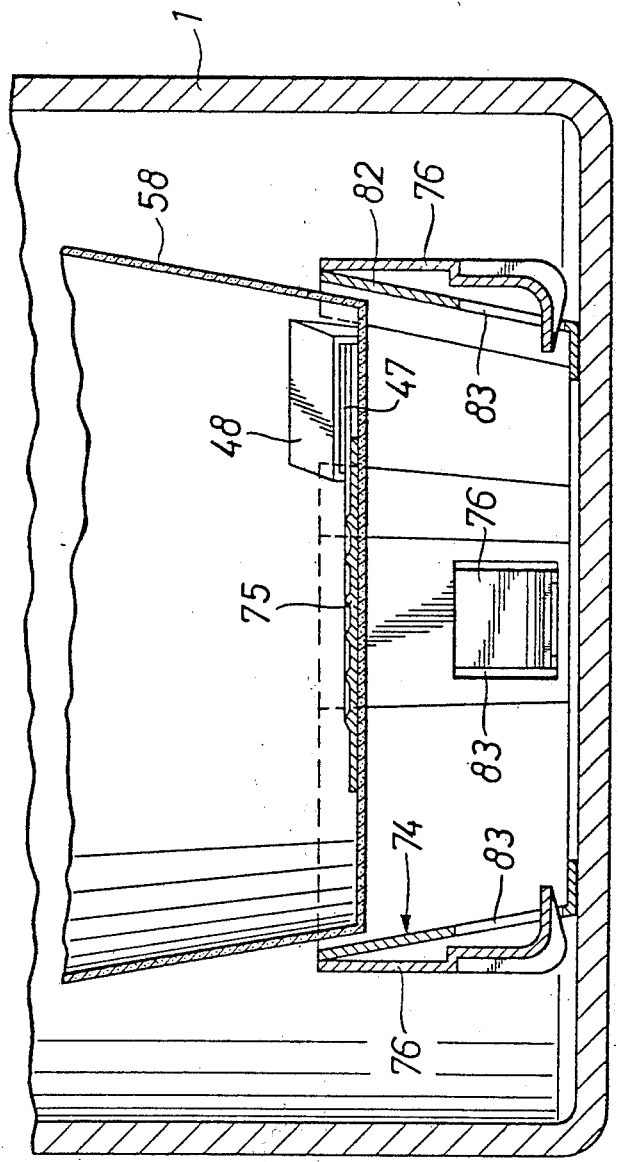
Figure 18:
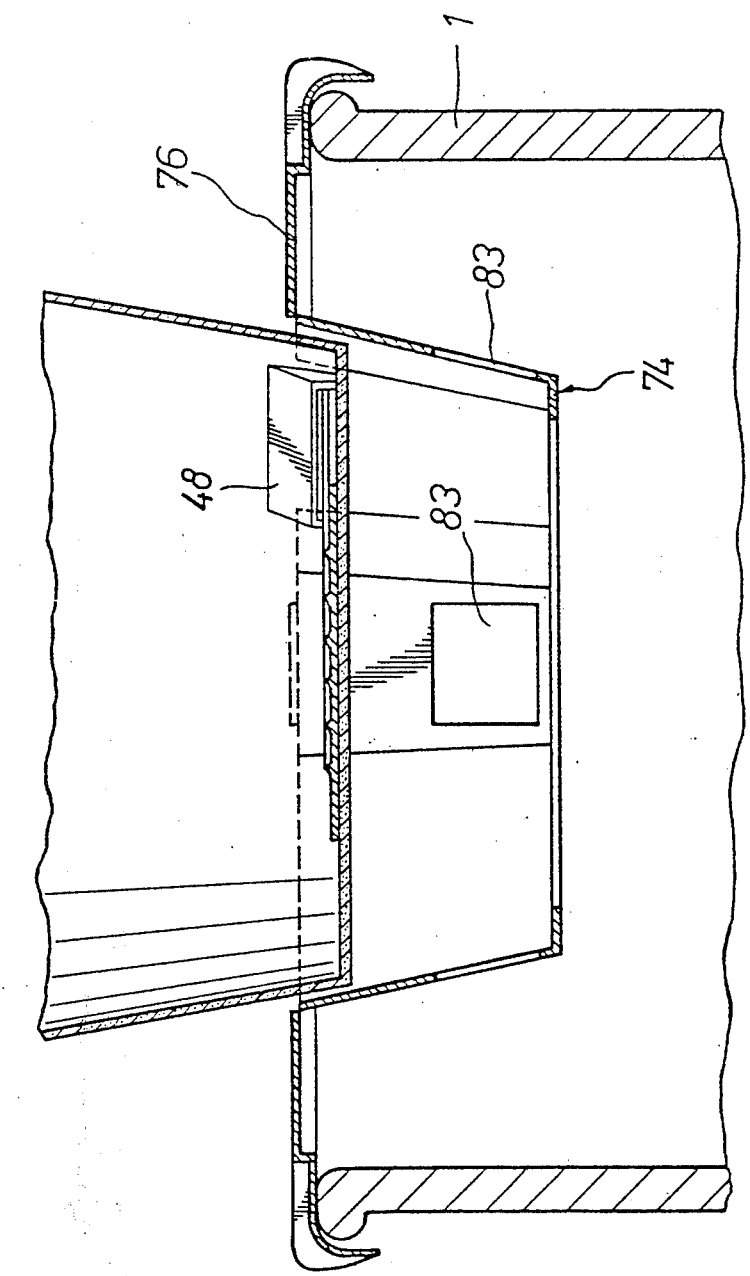
Figure 19:
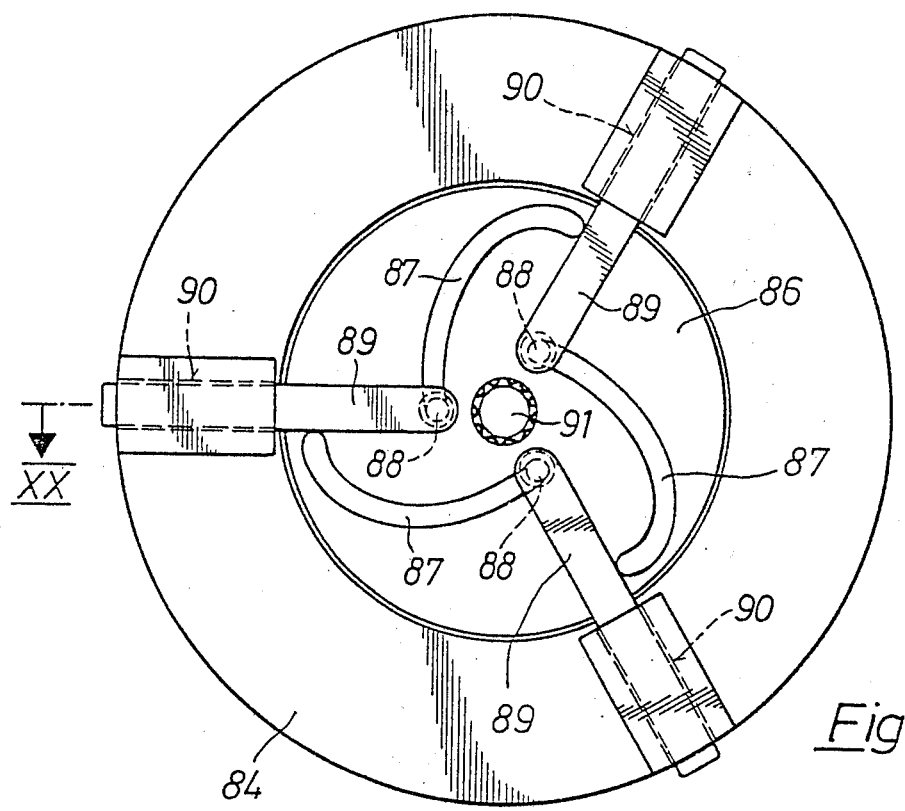
Figure 20:
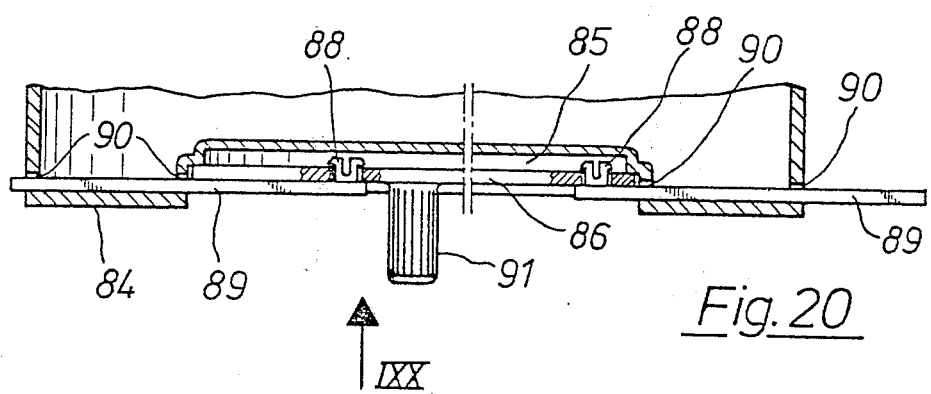
Figure 21:
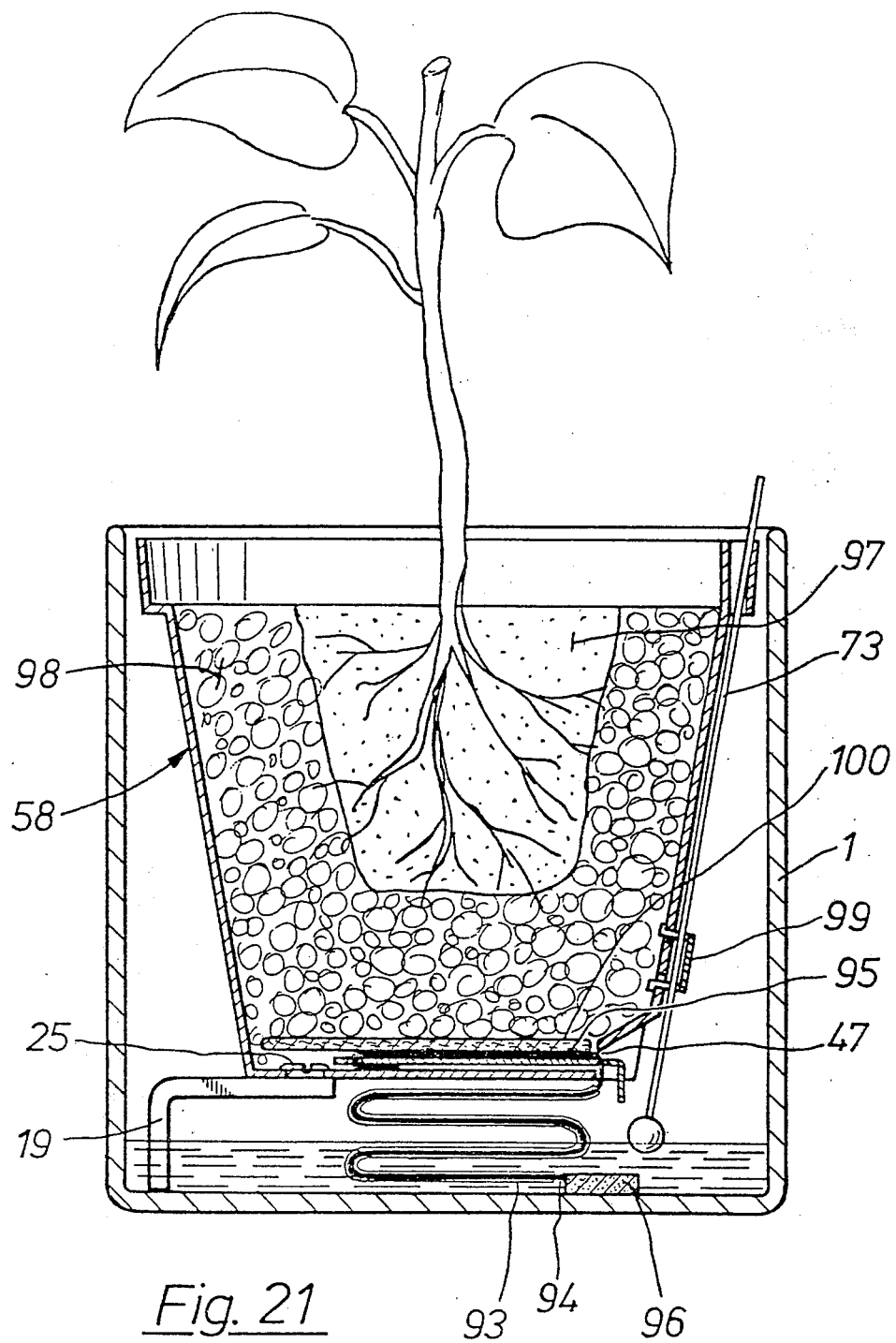

Various embodiments of the invention are described in detail below with the aid of the drawings in which FIG. 1 shows a plant pot with a rigidly connected unit and an adapter and level indicator mounted on a diagrammatically represented re-potting unit, FIG. 2 is a view in the direction II shown in FIG. 1, with a diagrammatically illustrated plant pot, the re-potting unit having been omitted, FIG. 3 is an alternative embodiment according to FIG. 1, FIG. 4 is a view in the direction IV shown in FIG. 3, FIG. 5 is a partial section of the plant pot shown in FIG. 3, FIG. 6 is a view in the direction VI shown in FIG. 5, FIG. 7 is a further alternative embodiment according to FIG. 1 with a diagrammatically illustrated plant pot, the unit connected thereto, the level indicator and adapter fitted in a re-potting unit, FIG. 8 is a view in direction VIII shown in FIG. 7, FIG. 9 shows a plant pot with a slot-shaped opening, an inlet slope, an opening opposite the said slot-shaped opening, a filling funnel and grooving for guiding an indicating element, FIG. 10 is a view in the direction X shown in FIG. 9, FIG. 11 is an alternative embodiment of a plant pot shown in FIG. 9, FIG. 12 is a view in the direction XII shown in FIG. 11, FIG. 13 shows another alternative embodiment of a device comprising a ring-shaped adapter, FIG. 14 is a view in the direction XIV shown in FIG. 13, FIG. 15 shows another alternative embodiment of a unit with an adapter at the manufacturing stage, FIG. 16 shows the unit according to FIG. 15, introduced into a plant pot, FIG. 17 shows the unit locked in the plant pot and fitted in a re-potting unit, FIG. 18 shows the adapter in an extended position and mounted on a re-potting unit, FIG. 19 shows an alternative embodiment of an adapter, FIG. 20 is a section along the line XX shown in FIG. 19, the sliding arm on the left hand side of the figure being in a retracted position and the sliding arm on the right hand side being in an extended position, and FIG. 21 shows a device together with a plant.

The same reference numerals are only used in the following description for completely identical parts. If a part differs slightly from the preceding one in design, even if it fulfils exactly the same function, a new reference numeral is used.

FIG. 1 shows a device comprising a unit 2 rigidly connected to a plant pot 3 to form an assembly. The adaptor 4 and level indicator 5 are attached to the unit 2. The level indicator 5, molded to the unit 2, consists essentially of a protective trough 6 with a water inlet 7, a guide support 8, an indicating element 9 and the float 10. A guide holder 12 for the indicating element is provided at the end 11 of the guide support 8.

A tongue 14 supporting the absorbent wick 15 is formed out of the bottom 13 of the unit 2. The tongue 14 and absorbent wick 15 are connected to the plant pot 3 by a slot-shaped opening 16 therein. The different forms which the slot-shaped opening 16 can take will be described in even more detail in later examples. The absorbent wick 15 leads into the water reservoir of the re-potting unit 1 (the reservoir not being shown in detail in this example). To obtain a positive connection between the unit 2 and plant pot 3, the unit is provided with a raised edge 17 for receiving the base 18 of the plant pot 3.

In this embodiment the adapter 4 comprises three swivel arms 19 attached to the unit 2 by slotted locking studs 20 in retaining holes 21.

The swivel arms 19 are provided with retaining claws 22 to ensure secure mounting on the re-potting unit 1. These claws 22 serve at the same time to adjust height relative to the trough 6 when the assembly is fully inserted in the re-potting unit 1. The embodiment having a large water capacity for solving the socalled holiday problem is illustrated in FIGS. 1 and 2.

The embodiment shown in FIGS. 3 to 6 differs from the previously described device in that the connection between the unit and plant pot is modified. The bottom 24 of the plant pot 23 is provided with a double T-shaped hole 26 in addition to the standard drain holes 25. This double T-shaped opening 26 receives the unit 27 by way of the tongue 28, which supports the absorbent wick 29. The level indicator 5 and adapter 4 are the same as in the embodiment shown in FIGS. 1 and 2.

FIGS. 7 to 12 show a further alternative embodiment of a device. The plant pot 30 is connected to a unit 31 by way of a tongue 32, the said tongue 32 supporting the absorbent wick 33. The protective trough 35 is molded to the bottom 34 of the unit 31 and provided with a side opening 36 for introducing the indicating element 37. The indicating element 37 is provided with an angled section for receiving the float 10. A support 40 for the indicating element 37 of the level indicator is molded to the edge 38 of the unit 31, which engages positively in the base 39 of the plant pot 30. In addition, the indicating element extends through a channel 41 in the edge area 42 of the plant pot 30. Sliding arms 43 are provided as an adapter at the bottom 34 of the unit 31. These arms are guided in a holder 44 rigidly connected to the bottom 34. Webs 45 provided at the bottom of the re-potting unit 1 serve as a means of adjusting the height of the trough 35. The plant pot 30 is only indicated by a chain-dotted line in FIG. 8.

FIGS. 9 to 12 show two different embodiments of plant pots provided with a funnel. In this connection, the fact that these plant pots can be varied depending on use and adapted to suit the appropriate device does not require any detailed explanation.

The plant pot 46 has a slot-shaped opening 47 with a sloping inlet 48. This opening 47 is defined by a wall section 49 above the bottom 50 of the plant pot, also covering the thickness of the pot bottom in this case. The bottom of the plant pot is recessed in the vicinity of the sloping inlet 48. The standard drain holes 25 are also provided in the pot bottom 50. A slot-shaped opening 51 lies opposite the slot-shaped opening 47. In its upper edge area 52 the plant pot 46 is provided with a slot 53 for receiving a funnel 54. The funnel 54 is slid onto the pot wall 56 by means of two retaining side pieces 55. On the side opposite the funnel the edge area 52 of the plant pot 46 is provided with a channel 57 for guiding an indicating element (not shown here). In its bottom section 59 the plant pot 58 shown in FIGS. 11 and 12 is the same as the plant pot 46. In this case the edge area 52 of the plant pot 58 is provided with a slot 60 only on the side of the sloping inlet 48. The funnel 61 is inserted in this slot 60 and, in this case, is retained on the pot wall 63 by four fingers 62. In addition, a guide 64 for the indicating element (not shown) is formed in the funnel 61.

FIGS. 13 and 14 show a further alternative embodiment of a device. In this case the re-potting unit 65 is provided with side pieces 66 and 67 at different levels. In this case the adapter unit comprising the absorbent wick and level indicator is in the form of a ring 68. Fitting at two different levels, i.e. for a reservoir for the normal water supply and a reservoir for providing a greater water supply during holiday time, is achieved by turning the plant pot 69/ring 68 unit and mounting it on the side pieces 66 and 67, respectively.

The connection between the ring 68 and plant pot 69 is made by the tongue 70 which in turn supports an absorbent wick 71. The ring 68 is provided with a notch 72 for guiding the indicating element 73. The funnel 61 and guide 64 act as a second means of guiding the indicating element. The plant pot is again omitted from FIG. 14 for the sake of greater clarity.

Another embodiment is illustrated in FIGS. 15 to 18. A tongue 75 and folding arms 76 are molded to the unit 74 by film hinges. The tongue 75 has a slot 77 for receiving an absorbent wick (not shown), and a guide channel 78 for the level indicator and locking cams 79. The unit 74 is connected to a plant pot, for example the plant pot 58 shown in FIG. 11, by inserting the tongue 75 into the slot-shaped opening 47 through the sloping inlet 48 and pushing it out again through the opposite opening 51. Then the unit 74 is rotated in the arrow direction 80 and locked by means of the locking cams 79 and locking slots 81. The level indicator is arranged as shown in the embodiment in FIG. 13.

FIG. 17 shows the unit 74 and plant pot 58 arranged in the re-potting unit 1. The unit 74 is provided with retaining holes 83 in the peripheral wall 82. The folding arms 76 are swung into these holes when the water is at a low level. In the embodiment for solving the so-called holiday problem as shown in FIG. 18, the folding arms are swung out and suspended on the edges of the re-potting unit 1.

FIGS. 19 and 20 show a further alternative embodiment of an adapter.

On the bottom 84 of a plant pot or unit, a control disk 86 with spiral cams 87 is rotatably mounted in a recess 85. Control pins 88 of sliding arms 89 engage the spiral cams 87, the said sliding arms 89 extending through double slots 90 in the bottom 84. The sliding arms 89 are adjusted by a control knob 91.

The embodiments mentioned are only intended to show some of the possible variations according to the invention. Thus, the illustrated embodiments can naturally also vary from one another in any desired manner. For example, another device as shown in FIG. 21 is conceivable in such a way that the plant pot 58 shown in FIG. 11 is only designed with an opening 47 for receiving an absorbent wick and tongue. Acting as an adapter, the swivel arms 19 are directly locked in the standard drain holes 25 in the plant pot 58. An indicating element 73 as shown in FIG. 13 could be used as a level indicator, in which case only one additional guide 99 would need to be clipped on the plant pot 58.

Moreover, the absorbent wick as shown in FIG. 21 can be partially coated with a protective film 93 to prevent water evaporation. This prevents too much water from evaporating along the aspiration path in the event of strong sunlight and during holiday periods. In this case the protective film is advantageously designed so as to leave free only the absorption area 94 directly in the water and the transfer area 95 in the unit. In order to ensure proper immersion in the water, it is advantageous to provide the end of the wick in this embodiment with a counterweight 96.

LIST OF REFERENCE NUMERALS

1—Re-potting unit
2—Unit
3—Plant pot
4—Adapter
5—Level indicator
6—Protective trough
7—Inlet
8—Guide support
9—Indicating element
10—Float
11—End
12—Guide holder
13—Bottom
14—Tongue
15—Absorbent wick
16—Slot-shaped opening
17—Edge
18—Base
19—Swivel arms
20—Locking stud
21—Retaining holes
22—Retaining claws
23—Plant pot
24—Bottom
25—Standard drain hole
26—Double T-shaped opening
27—Unit
28—Tongue
29—Absorbent wick
30—Plant pot
31—Unit
32—Tongue
33—Absorbent wick
34—Bottom
35—Protective trough
36—Side opening
37—Indicating element
38—Edge
39—Base
40—Holder
41—Channel
42—Edge area
43—Sliding arms
44—Holder
45—Side pieces
46—Plant pot
47—Slot-shaped opening
48—Sloping inlet
49—Wall section
50—Plant pot bottom
51—Opposite opening
52—Edge area
53—Slot
54—Filling funnel
55—Retaining side pieces
56—Plant pot well
57—Channel
58—Plant pot 59—Bottom section
60—Slot
61—Filling funnel
62—Fingers
63—Plant pot well
64—Guide
65—Re-potting unit
66—Side pieces
67—Side pieces
68—Ring
69—Plant pot
70—Tongue
71—Absorbent wick
72—Guide notch
73—Indicating element
74—Unit
75—Tongue
76—Folding arms
77—Receiving slot
78—Guide notch
79—Locking cam
80—Direction of arrow
81—Locking holes
82—Peripheral wall
83—Retaining holes
84—Bottom
85—Recess
86—Control disk
87—Spiral cams
88—Control pins
89—Sliding arms
90—Double slots
91—Control knob
92—Slots
93—Protective film
94—Absorption area
95—Transfer area
96—Counterweight
97—Core of soil
98—Substrate
99—Guide
100—Absorbent mat

We claim:

1. Apparatus for supplying a potted plant with air, and liquids including water and nutrients from a reservoir comprising:
    a pot for holding the plant and including a base having a slotted opening in its periphery;
    a holder unit for supporting the pot and having a tongue for insertion into the slotted opening, the tongue having a flat wick positioned thereon for watering and feeding the plant potted in the pot so that the wick may be inserted into the pot after the pot is filled with soil;
    holder unit including level indicator means for showing the amount of liquid in the reservoir; and
    an adapter movably attached to the unit for varying the height of the pot with respect to the reservoir so that liquid can be added to the reservoir.

2. The apparatus as claimed in claim 1 wherein the adapter comprises swivel arms which can be locked into the holder unit.

3. The apparatus as claimed in claim 1 wherein the level indicator means comprises:
    a protective trough;
    a support extending from the trough; and
    an indicating element positioned in the trough and guided by the support.

4. The apparatus as claimed in claim 3 wherein the indicating element is ribbon-shaped.

5. The apparatus as claimed in claim 4 wherein the indicating element is provided with predetermined markings so that the reservoir may be filled to different capacities.

6. The apparatus as claimed in claim 1 further comprising a plant support in said pot and including a ball of soil directly enclosing at least the root ball of the plant and surrounded by an air-permeable, capillary substrate.

7. The apparatus as claimed in claim 6 wherein the substrate is bonded together so as to encapsulate the soil.

8. The apparatus as claimed in claim 1 wherein the wick is provided with a protective film to prevent evaporation in an area between the unit and the water in the reservoir.

9. The apparatus as claimed in claim 1 wherein the end of the wick is provided with a weight.

* * * * *